United States Patent

[11] 3,579,090

[72] Inventor Eric V. Madsen
 New Shrewsbury, N.J.
[21] Appl. No. 823,120
[22] Filed May 8, 1969
[45] Patented May 18, 1971
[73] Assignee Bell Telephone Laboratories, Incorporated
 Murray Hill, Berkeley Heights, N.J.

[54] SWITCHING REGULATOR WITH RAPID SWITCHING DRIVE
 6 Claims, 3 Drawing Figs.
[52] U.S. Cl............................................. 323/22,
 323/38
[51] Int. Cl......................................... G05f 1/56
[50] Field of Search........................................ 321/2, 18,
 19; 323/4, 16, 17, 18, 22 (T), 22 (ER), 38

[56] References Cited
UNITED STATES PATENTS

| | | | |
|---|---|---|---|
| 3,263,099 | 7/1966 | Bedford.......................... | 321/2UX |
| 3,350,628 | 10/1967 | Gallaher et al. ................ | 323/4 |
| 3,396,326 | 8/1968 | Kisrow.......................... | 323/17X |
| 3,453,521 | 7/1969 | Schultz et al. ................. | 321/2 |

Primary Examiner—J. D. Miller
Assistant Examiner—A. D. Pellinen
Attorneys—R. J. Guenther and E. W. Adams, Jr.

ABSTRACT: A switching type regulator reduces switching transition times by increasing the magnitude of the switching control signal at the exact interval of the occurrence of the switching transition. The magnitude of the switching control signal is in turn responsive to the output voltage and hence the circuitry to reduce switching transition times also functions to regulate the output voltage.

Patented May 18, 1971

TIMING DIAGRAM

INVENTOR
E. V. MADSEN
BY Alfred V. Steinmetz
ATTORNEY

SWITCHING REGULATOR WITH RAPID SWITCHING DRIVE

BACKGROUND OF THE INVENTION

This invention relates to power converters and more particularly to a switching type power regulator and to switching control circuitry therein to increase the regulator switching speed.

Power converters accept energy from an unregulated energy source such as a voltage source and derive therefrom a regulated voltage applied to a load circuit. This regulation function is performed by interposing a regulating device between the source of energy and the load circuit. The regulating device normally comprises a controlled variable impedance interposed between the source and the load. This variable impedance is continuously varied in its impedance magnitude in order to maintain a constant voltage or current at the load circuit. These variable impedance devices, unfortunately, dissipate significant amounts of the power transmitted from the source to the load.

Switching type regulating devices control the rate of energy transmission in a discontinuous manner and consume less power in their regulating action than do the above-described variable impedance type regulating devices. The switching type regulating device is normally interposed between the source of energy and the load. The switching device theoretically has only two modes of operation: conduction and nonconduction. The switching device periodically conducts for a time interval sufficient to maintain the power output at a certain predetermined level. The periodic conducting time interval of the switching device is changed to correct the power output should it deviate from its predetermined level.

The magnitude of the power delivered to the load circuit is directly dependent upon the duty cycle of the switching device, that is, the ratio of its conducting time to its nonconducting time. It is apparent that since the switching device either fully conducts with a very low impedance or does not conduct at all, the power dissipated therein is very small. Hence, a switching type regulator is very efficient in transferring power from the source to the load as compared with the conventional regulator utilizing a variable impedance.

More switching type regulators utilize semiconductor devices, such as power transistors, as the switching device. The semiconductor device is fully saturated when it is conducting, and hence very little power is dissipated therein. The semiconductor device in its nonconducting condition is fully turned off and again no power is dissipated therein. Power, however, is dissipated in the semiconductor device during the time interval of the switching transition from the nonconducting condition to the conducting condition and vice versa. Hence during this switching time interval a substantial amount of power may be dissipated in the semiconductor device. This power dissipation, if large enough, may damage the semiconductor device.

It is an object of the invention to reduce the power dissipation in the semiconductor device during its switching interval from one conduction state into another conduction state.

It is another object of the invention to reduce the switching transition time interval of a switching type regulator to a minimum.

SUMMARY OF THE INVENTION

Therefore in accord with the present invention, a circuit arrangement is included in a switching type regulator to increase the speed at which the switching device switches from one conduction state into the other conduction state.

In one particular embodiment of the switching type regulator, nonregulated voltage source is repeatedly connected to and disconnected from an energy storage element such as an inductor. This energy storage element or inductor is in turn coupled to an output load circuit. The semiconductor switching device is energized, via a switch control comprising a driver transistor, which in turn is controlled by a two level current source. The two level current source is coupled to the output voltage sensing impedance and to the control electrode of the driver transistor. The necessary current to bias the driver transistor into a conducting condition becomes available only when current in the output control impedance drops below a certain level. As the driver transistor initially begins to conduct, the current source is switched into a higher level current condition in order to supply additional current to speed up turn-on in the driver transistor. Hence, the speed of turn-on of the semiconductor switching device, controlled by the driver transistor, is also increased significantly. This increased switching speed reduces power dissipation in the semiconductor switching device.

An advantage of the circuit of the invention is that the two level current source, by responding to a drop in the current in the output control impedance, regulates the output voltage. The charge and discharge cycle of the inductor occurs only when the current source has progressed through a cycle of operation.

BRIEF DESCRIPTION OF THE DRAWING

Many additional features, advantages and other objects of the invention will become apparent upon consideration of the following detailed description of a specific switching type regulator embodiment utilizing the principles of the invention. The following description is to be taken in conjunction with the attached drawings in which.

DETAILED DESCRIPTION

Figure 1:
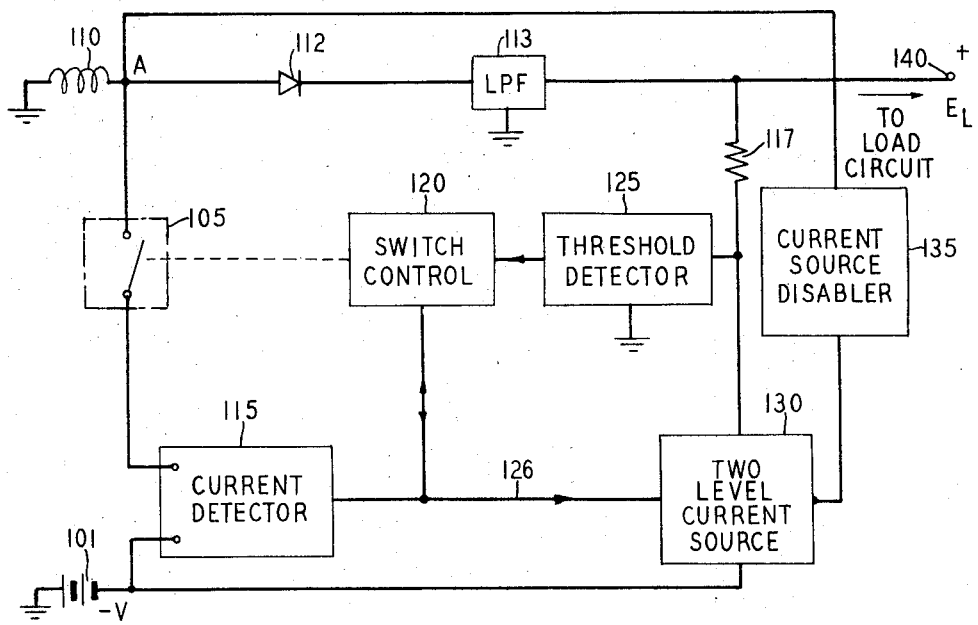
FIG. 1 is a block diagram of a switching type regulator embodying the principles of the invention.

The switching type regulator disclosed in FIG. 1 is connected to a voltage supplied by a DC voltage source 101 which may comprise a battery. The regulated voltage supplied at the output terminal 140 is derived from the voltage source 101. This regulated voltage has a polarity opposite the polarity of the voltage supplied by the source 101. While the switching regulator illustrated by way of example herein alters the polarity of the regulated voltage from the source voltage, it is to be understood that the principles of the invention are equally applicable to switching type regulators in which the regulated output voltage is the same polarity as that of the voltage source 101.

The voltage supplied by the source 101 is coupled, via a current detector 115 and a switching device shown schematically in FIG. 1 as a simple switch 105, to an energy storage device or inductor 110. The inductor 110 preferably includes a magnetic core to facilitate the storage of magnetic flux. The switch 105 is preferably a semiconductor switching device.

Upon closing the switch 105, a current in response to energy supplied by the source 101 is transmitted through the inductor 110. As a result of this current, energy is stored in the inductor 110 in the form of magnetic flux stored in its core. When the switch 105 is opened the energy stored in the inductor 110 is released and transmitted, via the diode 112, and a low pass filter 113 to the output terminal 140. The regulated output voltage at the output terminal 140 is derived from the voltage drop across the resistor 117.

In accord with the principles of the invention, apparatus is included in the switching regulator circuit to reduce the switching transition time of the switch 105, between conducting and nonconducting states, to a minimum. This apparatus, as is apparent herein below, additionally regulates the output voltage. Its operation is explained herein by describing in detail a typical regulation cycle of the switching type regulator.

Figure 2:
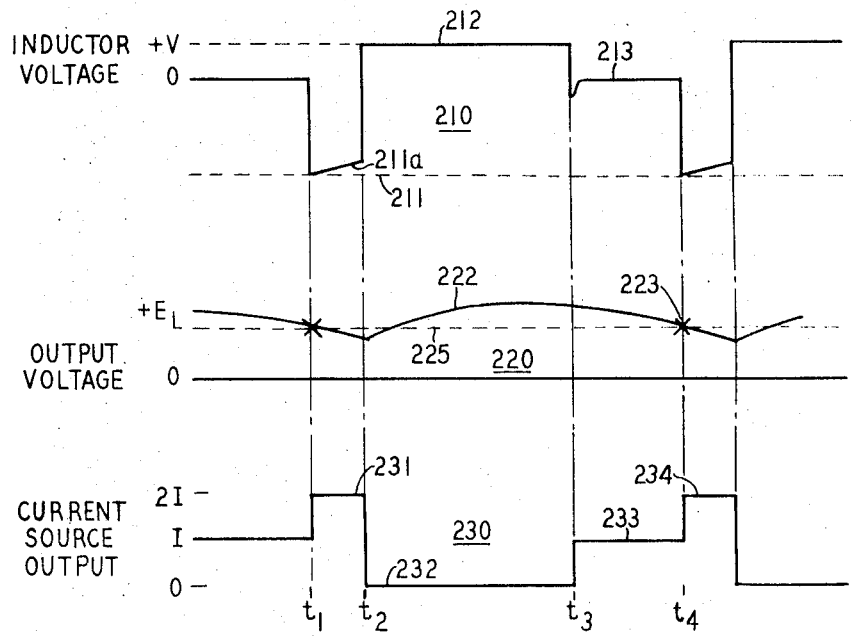
FIG. 2 shows waveforms which illustrate the operation of the circuit shown in FIG. 1.

The typical regulation cycle normally begins at the time $t_1$, as shown in FIG. 2, when the switch 105 is initially closed in response to the switch control 120. With the switch 105 closed, energy is coupled from the source 101 to the inductor 110. A current begins to flow from ground through the inductor 110 and the switch 105 to the negative voltage source 101. As shown by the waveform 210 in Fig. 2, the voltage at the terminal A in FIG. 1 drops to the negative voltage of the source 101 at time $t_1$. This is shown by the voltage level 211. As will be explained below, the two level current source 130, at the time $t_1$, is switched into its high level conduction state, as shown by current level 231 in waveform 230.

The current flowing from ground through the inductor 110 to the negative source 101 stores energy in the inductor 110 in the form of magnetic flux. Due to the increase in the current through the detector 115, the voltage at point A increases as indicated by the positive slope 211a of the voltage waveform 210, subsequent to $t_1$. This current continues to increase until it reaches a certain threshold level at time $t_2$ at which time the current detector 115 responds to the increasing current.

The current detector 115 at time $t_2$ applies a signal to the switch control 120. The switch control 120 in response to the activated current detector 115 opens the switch 105. An inertial current continues to flow in the inductor 110 due to the stored flux energy therein. The reverse voltage in the inductor 110, due to the decay of the stored flux therein, increases the inductor potential at the point A to the positive level 212 as shown in FIG. 2. This positive potential activates the current source disabler 135. The activated current source disabler 135 applies an inhibit signal to the current source 130. The current output of the current source 130 in response to the inhibit signal drops to a no current zero level 232 as shown in FIG. 2.

The voltage level 212 at point A, subsequent to time $t_2$, forward biases diode 112 and a load current flows through the diode 112 and the low pass filter 113 to a load connected to output terminal 140. The voltage level 222 at the output terminal 140 exceeds the threshold level 225, shown in waveform 220, above which level the threshold detector 125 is deactivated. The low pass filter 113 is included to reduce variations in the output voltage due to the switching action of the regulator. The variation shown in waveform 220 is exaggerated from illustrative purposes. The actual variation in the regulated voltage is very small.

Current continues to flow in the inductor 110 until the stored flux is dissipated at time $t_3$. When the inductor 110 ceases to conduct current, the voltage level at point A drops to the ground potential 213 as shown in FIG. 2. The diode 112 in response to this voltage is back biased and the load current flowing to filter 113 is terminated. Accordingly the voltage at the output terminal 140 begins to decay toward the threshold level 225 at point 223.

The existing ground potential at point A, shown as voltage 213 in FIG. 2, deactivates the current source disabler 135 permitting the current source 130 to turn on at time $t_3$ to its low current level state shown by current level 233 in FIG. 2. Initially the total current drawn by the current source 130, just subsequent to time $t_3$, is drawn through the resistor 117. However as the output voltage decreases toward voltage level 225 at time $t_4$ the current flow through resistor 117 decreases in value below the current level drawn by the current source 130. The difference in current is hence drawn from the threshold detector 125. The difference current is sufficient to initiate the turn-on of the threshold detector 125. The threshold detector 125 in turning on turns on the switch control 120 which applies a current level control signal, via lead 126, to the current source 130. This current level control signal switches the current source 130 into its higher current level state at the time $t_4$. This high level current state is shown by the current level 234 in FIG. 2. With the current source 130 in its high level current state the threshold detector 125 in its high level current state the threshold detector 125 is rapidly switched into its full maximum operating state. The rapidly switched threshold detector 125, in turn, rapidly switches the switch control 120 into its full maximum operating state. The switch control 120 in its full maximum operating state rapidly closes the switch 105. The switch 105 remains closed until the current detector 115 is activated whereupon the above-described cycle of operation is repeated.

It is apparent from the foregoing that by utilizing the two level current source 130 to accelerate the switching action of the threshold detector 125, the switching action of the switch 105 rapidly accelerated. Hence the switching transition period during which power is dissipated in the switch 105 is significantly reduced.

The two level current source 130 additionally functions to regulate the magnitude of the output voltage at the output terminal 140 which is greater than any other voltage in the circuit including the source voltage. When the inductor voltage at point A exceeds a certain level, the current source 130 is disabled by the current source disabler 135. When the current in the resistor 117 decreases below a certain threshold due to a decline in the output voltage, the threshold detector 125 is activated and in turn activates the current source 130. This threshold current is the low level current capacity of the current source 130, shown as current level 233 in FIG. 2. The activated current source 130 draws a larger current through the resistor 117 until the inductor voltage again brings about its disablement. This arrangement readily permits regulation of the output voltage without resort to conventional voltage comparison techniques.

Figure 3:
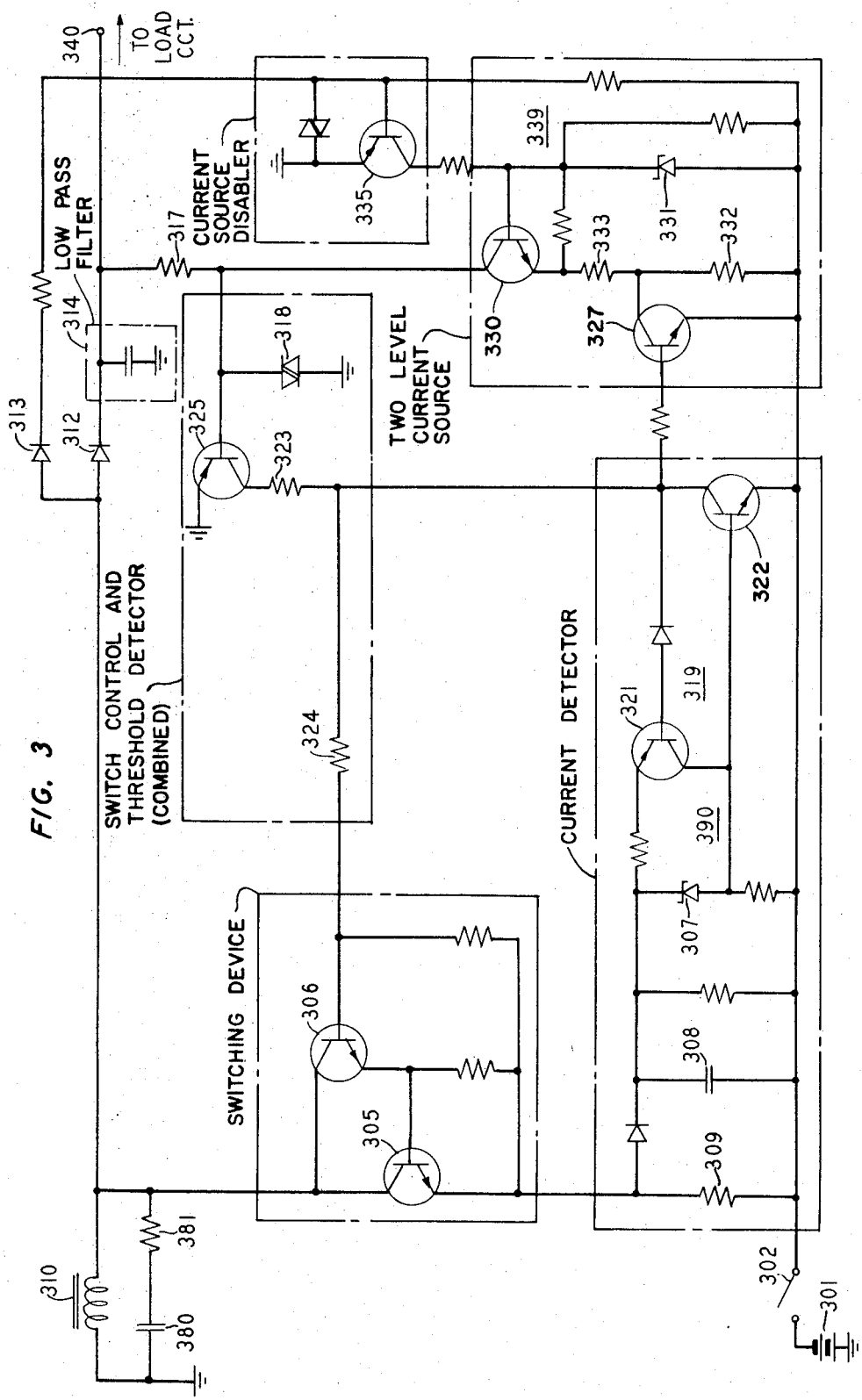
FIG. 3 is a detailed schematic diagram of a regulator circuit in accord with FIG. 1 embodying the principles of the invention.

A detailed circuit schematic of the switching regulator is shown in FIG. 3. In the circuit shown in FIG. 3, two compound connected switching transistors 305 and 306 are utilized as the switching device which is designated in FIG. 1 as switch 105. The transistor 325 performs the functions of the threshold detector 125 and the switch control 120. The current source 339 performs the function of the current source 130 and the transistor 335 performs the function of the current source disabler 135.

The closing of the manual switch 302 at the time $t_1$ couples the negative voltage source 301, via the transistors 305 and 306, to the energy storage inductor 310. With the transistors 305 and 306 biased into a conducting state, current flows from ground, via the inductor 310, to the negative voltage source 301. The capacitor 380 and resistor 381 shunting the inductor 310 are included to suppress ringing transients which may be generated as the inductor 310 is repeated connected to and disconnected from the source 301. A current detecting resistor 309 is included in this current condition path and is utilized to generate a threshold control signal to control the current detector circuitry 390 which in turn activates the holding circuit 319 comprising transistors 321 and 322.

The transistor 330, which is included in the current source circuitry 339, is at this time subsequent to $t_1$ in the conducting state designated by current level 231 in FIG. 2. This current flows through the resistor 317 and through the collector-emitter path of transistor 330. The transistor 330 is drawing a current determined by the bias voltage established by Zener diode 331, which is in excess of the current traversing the resistor 317. This excess current is drawn from the transistor 325 and biases it into a saturated condition. With transistor 325 saturated, the switching transistors 305 and 306 in their active region just prior to $t_1$ are rapidly biased into saturation. Hence, as described above, a current begins to flow from ground through inductor 310 to the negative voltage source 301.

As the current flowing through the inductor 310 increases in magnitude, the voltage drop generated across the current detector resistor 309 increases. The voltage drop across the resistor 309 is applied to the capacitor 308 and thence to the emitter electrode of the transistor 321. When the voltage of capacitor 308 exceeds a predetermined threshold value as set by Zener diode 307 at time $t_2$, the transistors 321 and 322 are biased into their conducting state. The transistor 321 is connected to the transistor 322 in a compound connection to form a holding circuit 319. This holding circuit is functionally a part of the current detector 115 as shown in FIG. 1 and serves merely to cause the switch control 120 to release the switch 105. The operation of such holding circuits is well known in the art and hence is not discussed herein in detail.

With the transistors 321 and 322 conducting current, the current output of the transistor 325 is diverted from the base electrode of the transistor 306. Hence the transistors 305 and 306 are biased into a nonconducting state. As is apparent to those skilled in the art, the transistors 321 and 322 remain in their conducting state until the charge stored on capacitor 308 is fully discharged.

The switching transistors 305 and 306 are biased into a nonconducting state by the diversion of the current output of transistor 325 to the holding circuit 319 and accordingly no energy is supplied to the inductor from source 301. The stored flux in the inductor 310 begins to decay and the resultant induced reverse voltage therein forward biases the diodes 312 and 313. The inertial current of the inductor 110 is transmitted, via the diode 313, to the base electrode of the transistor 335 biasing it into a nonconducting state. With the transistor 335 in a nonconducting state the transmission of current through the Zener diode 331 of the current source 339 is disabled. The current source transistor 330 is accordingly biased into a nonconducting state thereby disabling the generation of current by the current source 339.

The inertial current supplied by the inductor 310 flows through the now forward biased diode 312, the low pass filter 314 and a load circuit connected to output terminal 340. A small portion of the load current is diverted through the resistor 317 and the varistor 318 to ground. A positive voltage approximating the waveform 220 in FIG. 2 is supplied at the output terminal 340. Due to the eventual dissipation of the stored flux in the inductor 310, the output voltage begins to decline in value subsequent to time $t_3$. At this time $t_3$ the voltage at the inductor 310 has declined sufficiently due to the dissipation of its stored flux to permit the transitor 335 to conduct current.

With transistor 335 conducting, a current path is completed from ground to negative source 301 permitting a current flow in the Zener diode 331. Accordingly the current source 339 begins to conduct current as the transistor 330 is biased into a conducting state. The transistor 330 conducts a current indicated by the current level 233 in FIG. 2. This current level is determined by the resistance magnitude of the resistors 332 and 333 which are connected to the collector-emitter path of the transistor 330. The current drawn by current source 339 is a constant defined by level 233. To maintain this level, as the current in resistor 317 decreases, current must be drawn from the base electrode of transistor 325. In response to this current drain the transistor 325. is biased into its active conducting state.

With the transistor 325 biased into its active conducting state, a current is transmitted, via resistors 323 and 324, to the base electrode of transistor 306 and from thence to source 301. In response to this current the transistors 305 and 306 start to switch into their active conducting state.

The current traversing the collector-emitter path of transistor 325 to the source 301 slowly increases in magnitude. At time $t_4$, the voltage drop across resistors 323 and 324 becomes sufficient to bias the transistor 327 into a conducting state. With transistor 327 conducting the resistor 332 in short circuited and hence removed from the emitter circuit of the current source transistor 330. Hence the current traversing the collector-emitter path of the current source transistor 330 is immediately increased to the higher current level 234, shown in FIG. 2, which in the illustrative embodiment is double its lower level value.

The increased higher level current traversing the collector-emitter path of the transistor 330 rapidly drives the transistor 325 into its saturation conducting state. The transistor 325 in its fully saturated conducting state, in turn, rapidly drives the transistors 305 and 306 into their fully saturated conducting state. The rapid turn-on of the transistors 305 and 306 significantly reduces power dissipation during the switching interval and hence greatly improves the efficiency of the regulator.

With the transistors 305 and 306 now in their fully saturated conducting state, an increased current begins to flow from ground through the inductor 310 to the negative source 301. This current increases in value until the current detected by the current detector circuit 390, via the resistor 309, is sufficient to again bias the transistors 321 and 322 of the holding circuit 319 into conduction and hence turn off the transistors 305 and 306 to repeat the regulation cycle.

It is apparent from the foregoing that the current source 339 in its response to the voltage of inductor 310 regulates the magnitude of the output voltage at output terminal 340 in addition to increasing the switching speed of transistors 305 and 306.

I claim:

1. A switching type regulator comprising, a switching device, a switching control to open and close said switching device, a source of energy, an energy storage element, said switching device connecting said source of energy to said energy storage element, an output control impedance coupled to said energy storage element, said switching control including means responsive to a particular threshold of the energy transmitted to said output control impedance from said energy storage element, said switch control being activated at said particular threshold and closing said switching device, a current generator coupled to said load output control impedance having at least two alternate current paths representing a lower and upper current level state control and means to switch said current generator into the upper of its two current level states by switching said current paths when said switch control initially responds to the energy transmitted to said output control impedance whereby the increased current generated by said current generator accelerates the closing of said switch by accelerating the said response of said switch control.

2. A switching type regulator as defined in claim 1 wherein one of said current paths of said two level current source includes a limiting impedance to limit the current generated therein and said means to switch comprises another one of said current paths including a semiconductor switch shunting said impedance to bypass said impedance and increase the current generated therein.

3. A switching type regulator as defined in claim 2 further including means to disable the operation of said current source subsequent to the closing of said switching device.

4. A switching type regulator as defined in claim 3 further including current detector means to respond to a predetermined threshold of current flowing through said energy storage element and means to transmit signals coupled to said switch control and responsive to said current detector means to divert activating signals generated by said current source from said switching control whereby said switching control is deactivated.

5. A switching apparatus in which a first electrical signal is repeatedly connected to and disconnected from an energy storage element in order to supply a second electrical signal at an output circuit, comprising a semiconductor switch including a control electrode and having its transconductive path connecting said first electrical signal to said energy storage element, means connected to said control electrode to energize said semiconductor switch into a conducting condition including a driver transistor having its base electrode coupled to said output circuit, a multilevel current source having low and high current outputs controlled by a variable current path impedance, said current source coupled to said base electrode and said output circuit whereby a drop in current in said output circuit allows the transfer of sufficient current to bias said driver transistor into a conductive state and means to increase the level of operation of said current source from its low to its high current output by reducing said current path impedance in response to initial current flow in said driver transistor whereby said driver transistor is more rapidly switched into its conductive state.

6. A switching apparatus as defined in claim 5 whereby said variable current path impedance includes a plurality of impedances connected to said multilevel current source and said means to increase the level of operation comprises means to bypass a selected number of said plurality of impedances.